(12) United States Patent
Jogand-Coulomb

(10) Patent No.: US 12,184,640 B2
(45) Date of Patent: Dec. 31, 2024

(54) DEVICE ENGAGEMENT CONNECTION SYSTEM WITH VERIFICATION

(71) Applicant: HID Global CID SAS, Suresnes (FR)

(72) Inventor: Fabrice Jogand-Coulomb, Aix en Provence (FR)

(73) Assignee: HID Global CID SAS, Suresnes (FR)

( * ) Notice: Subject to any disclaimer, the term of this patent is extended or adjusted under 35 U.S.C. 154(b) by 570 days.

(21) Appl. No.: 17/309,418

(22) PCT Filed: Nov. 27, 2019

(86) PCT No.: PCT/EP2019/082767
§ 371 (c)(1),
(2) Date: May 26, 2021

(87) PCT Pub. No.: WO2020/109400
PCT Pub. Date: Jun. 4, 2020

(65) Prior Publication Data
US 2022/0337582 A1 Oct. 20, 2022

Related U.S. Application Data

(60) Provisional application No. 62/771,845, filed on Nov. 27, 2018, provisional application No. 62/771,849, (Continued)

(51) Int. Cl.
*H04L 9/40* (2022.01)
*G06F 16/955* (2019.01)
(Continued)

(52) U.S. Cl.
CPC ........ *H04L 63/0853* (2013.01); *G06F 16/955* (2019.01); *H04L 63/0442* (2013.01); *H04L 63/0823* (2013.01)

(58) Field of Classification Search
CPC ............. H04L 63/0853; H04L 63/0442; H04L 63/0823; H04L 69/40; H04L 69/14;
(Continued)

(56) References Cited

U.S. PATENT DOCUMENTS 10,356,087 B1 * 7/2019 Vetter ................. H04L 63/0838
10,366,378 B1 * 7/2019 Han .................... G06Q 20/204
(Continued)

FOREIGN PATENT DOCUMENTS

CN 1351789 5/2002
CN 101047495 10/2007
(Continued)

OTHER PUBLICATIONS

"Computer network", Wikipedia, Retrieved from the Internet: URL:<https://en.wikipedia.org/w/index.php?title=Computer_network &oldid=869526861>, (Nov. 19, 2018), 25 pgs.
(Continued)

*Primary Examiner* — Vu V Tran
(74) *Attorney, Agent, or Firm* — Schwegman Lundberg & Woessner, P.A.

(57) ABSTRACT

A method comprises transferring information that includes a response uniform resource locator (URL) between a primary device and a secondary device using a primary communication channel between the primary device and the secondary device; determining, using the secondary device, status of connectivity of a network separate from the primary communication channel; transmitting, by the secondary device, a response to a request from the primary device via the network using the response URL when the status indicates the network is available, and transmitting the response via the primary communication channel when the status indicates the network is unavailable.

12 Claims, 9 Drawing Sheets

Related U.S. Application Data filed on Nov. 27, 2018, provisional application No. 62/771,886, filed on Nov. 27, 2018, provisional application No. 62/779,864, filed on Dec. 14, 2018.

(51) Int. Cl.
  *G06F 21/43* (2013.01)
  *G06F 21/60* (2013.01)
  *H04L 69/40* (2022.01)

(58) Field of Classification Search
  CPC ...... G06F 16/955; G06F 21/43; G06F 21/606; G06F 2221/2103
  See application file for complete search history.

(56) References Cited

U.S. PATENT DOCUMENTS

| | | | |
|---|---|---|---|
| 2003/0005078 A1 | 1/2003 | Turicchi et al. | |
| 2014/0171065 A1* | 6/2014 | Graessley | H04W 76/19 455/426.1 |
| 2014/0273820 A1* | 9/2014 | Narayan | H04W 76/14 455/41.1 |
| 2015/0100490 A1 | 4/2015 | Agapitov | |
| 2016/0127898 A1* | 5/2016 | Gupta | G06F 21/43 726/7 |
| 2018/0315127 A1* | 11/2018 | Chappell | G06Q 20/3223 |
| 2019/0065724 A1* | 2/2019 | Dudley | G06F 21/35 |
| 2019/0149527 A1* | 5/2019 | John | H04L 63/0442 713/171 |

FOREIGN PATENT DOCUMENTS

| | | |
|---|---|---|
| CN | 10210031 | 6/2011 |
| EP | 2284816 | 2/2011 |
| WO | WO-2016099809 A1 | 6/2016 |
| WO | WO-2020109400 A1 | 6/2020 |

OTHER PUBLICATIONS

"International Application Serial No. PCT/EP2019/082767, International Search Report mailed Apr. 6, 2020", 7 pgs.
"International Application Serial No. PCT/EP2019/082767, Invitation to Pay Additional Fees mailed Feb. 13, 2020", 11 pgs.
"International Application Serial No. PCT/EP2019/082767, Written Opinion mailed Apr. 6, 2020", 8 pgs.
"Canadian Application Serial No. 3,121,032, Examiners Rule 86(2) Report mailed Jan. 5, 2024", 3 pgs.
"European Application Serial No. 19817167.0, Communication Pursuant to Article 94(3) EPC mailed Jul. 12, 2024", 6 pages.
"Chinese Application Serial No. 201980090708.1, Office Action mailed Sep. 30, 2024", with English translation, 25 pages.

\* cited by examiner

| type | Value | | Map | O |
|---|---|---|---|---|
| "Requester ID" | | | | O |
| "RespURL" | URL of the mDL reader for receiving the response by HTTPs POST | | | String |

*Fig. 7*

| type | Value | CBOR Type | |
|---|---|---|---|
| | | | M |
| "ListOfDOs" | | Map | O |
| "Requestor ID" | | Map | O |
| "RespURL" | URL of the mDL reader for receiving the response by HTTPs POST | Map | |

*Fig. 8*

| | |
|---|---|
| mDLReaderRequest = {} | |
| "ReaderEPKey" : bstr, ; Reader Ephemeral Public Key | M |
| "ISO/IEC 18013-5:2019" : [ + Data_Name], ; Name Space and Array of names of Data Items requested | M |
| ? "ReaderAuth" : bstr ; Optionally, reader authentication data, a signature. CMS structured byte string where signature value is (DE ∥ Reader Ephemeral Public Key)READER_STATICKEY_SIGN | O |
| "RespondToURL": bstr, ; URL for HTTPs Post the encrypted response CBOR | O |
| } | |
| Data_Name : tstr ; Name Identifier of the data elements requested (list label for DG(s) or specific element(s)) | M |

*Fig. 9*

| TAG | LEN | Value | |
|---|---|---|---|
| 6E | 81 | xx | 0 |
| | xx | mDL holder preferred language (ISO 639-2:1998, 3 letter code) | |

*Fig. 10*

DEVICE ENGAGEMENT CONNECTION SYSTEM WITH VERIFICATION

CLAIM OF PRIORITY

This application This application is a U.S. National Stage filing under 35 U.S.C. § 371 of PCT Patent Application No. PCT/EP2019/082767, filed on Nov. 27, 2019, which claims priority to U.S. Patent Provisional Application Ser. Nos. 62/771,845, filed Nov. 27, 2018, 62/771,849, filed Nov. 27, 2018, 62/771,886, filed Nov. 27, 2018, and 62/779,864 filed Dec. 14, 2018.

TECHNICAL FIELD

The technology described in this patent document relates to communicating information from a mobile device over a communication channel. In particular it relates to communicating sensitive information related to mobile identity documents, such as mobile driving licenses (mDLs), over a trusted communication channel.

BACKGROUND

A mDL provides the functionality of a driving license on a mobile device (e.g., smartphone, tablet, etc.). It also allows the latest information to be available to police office in the event of a traffic stop. However, information related to a driving license can be sensitive personal information that should only be communicated with an mDL reader or with the infrastructure of the issuing authority via a trusted communication channel.

BRIEF DESCRIPTION OF THE DRAWINGS

FIG. 7 is an example of including a uniform resource locator (URL) in an mDL reader Request.

FIG. 8 is another example of including a URL in an mDL reader Request.

FIGS. 9-10 are further examples of including a URL in an mDL reader Request.

DESCRIPTION

A mobile driving license (mDL) includes an application (mDL App) that executes on a mobile communication device (e.g., smartphone, tablet, etc.). In the event of a traffic stop, information related to the license may be communicated with the mDL reader of the issuing authority of the driving license. This information can be sensitive information for the driver and the information needs to be communicated between the mDL reader and the mobile device using a trusted channel.

Figure 1:
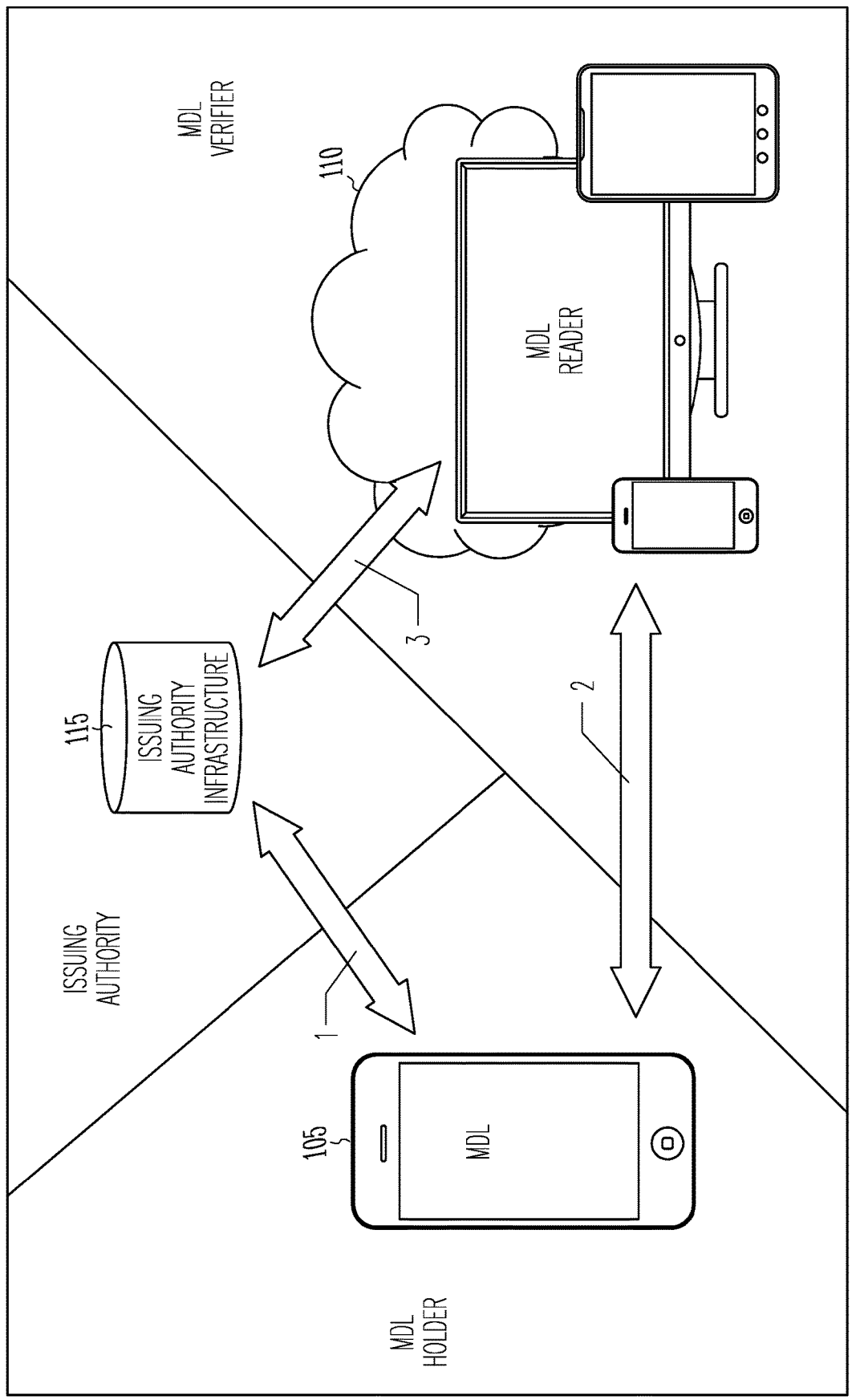
FIG. 1 is a block diagram of a mobile driving license (mDL) system.

FIG. 1 is a block diagram of portions of an example of an mDL system. The system includes the mDL holder 105 device (e.g., a smart phone) of the driver, the mDL reader 110 of the issuing authority, and the infrastructure 115 (e.g., one or more servers) of the issuing authority. To establish a trusted communication channel, device engagement (DE) data is communicated between the mDL holder 105 and the mDL reader 110. The DE data may be sent from the mDL App (mDL DE) or sent from the mDL reader or verifier device (vDE). For example, the DE data may include one or more encryption keys used to form the trusted channel. The device engagement may be started from the primary, verifier side or from the secondary, mDL App side.

Figure 2:
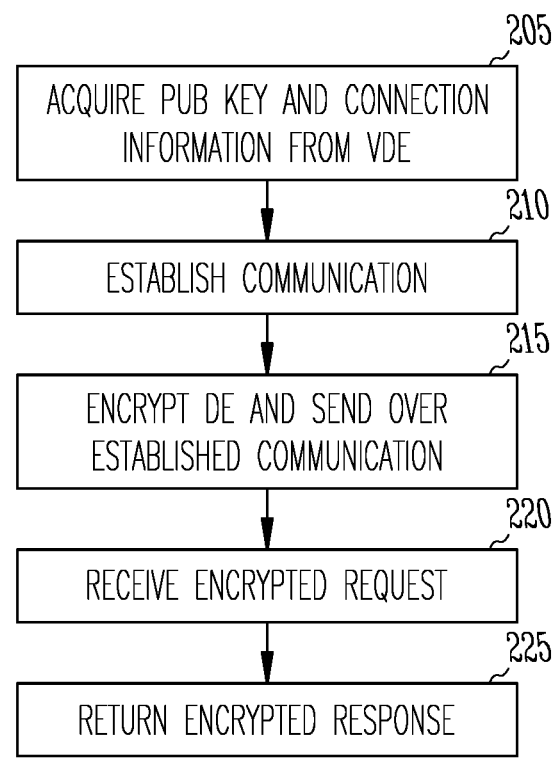
FIG. 2 is a flow diagram of an example of a method of mDL device engagement started from the verifier side.

FIG. 2 is a flow diagram of an overview of mDL device engagement started from the verifier side (verifier side device engagement or vDE). There may be cases where starting the engagement from the verifier side is preferable or starting from the verifier side may be the only option. At 205, some DE data is used by the mDL App to acquire the necessary information to establish a secure connection to the mDL reader. The DE data may include information read from a police officer's (or other authority personnel's) readable or scannable badge, a quick response (QR) code on a web page, or a click to App link on a webpage, or other media intermediate the mDL App and mDL reader. This information may include communication options available for communicating with the mDL reader. The information may include security information such as a public key that can be used to encrypt the communication channel. The public key may be at least somewhat ephemeral. At 210, communications are established between the mDL holder and the mDL reader.

At 215, the public key is used by the mDL App to encrypt the communication and encrypted DE data is sent over the established communication channel. The mDL App sends DE data encrypted either with the received public key or with a derived key. At 220, an mDL reader Request is sent encrypted using the derived key. The public key may be used to determine a new derived key. At 225, the encrypted Response is returned from the mDL reader.

The encrypted DE data may not be sent right away. In some embodiments, after the engagement data is transferred, the next communication may occur based on the proximity of the mobile communication device and the verifier device. For example, the engagement data may be transferred according to 205, and then the communication pauses. The subsequent processes continue according to a near proximity protocol (e.g., Blue tooth, a near field protocol, etc.) when the mobile device is in near proximity to the verifier device.

Figure 3:
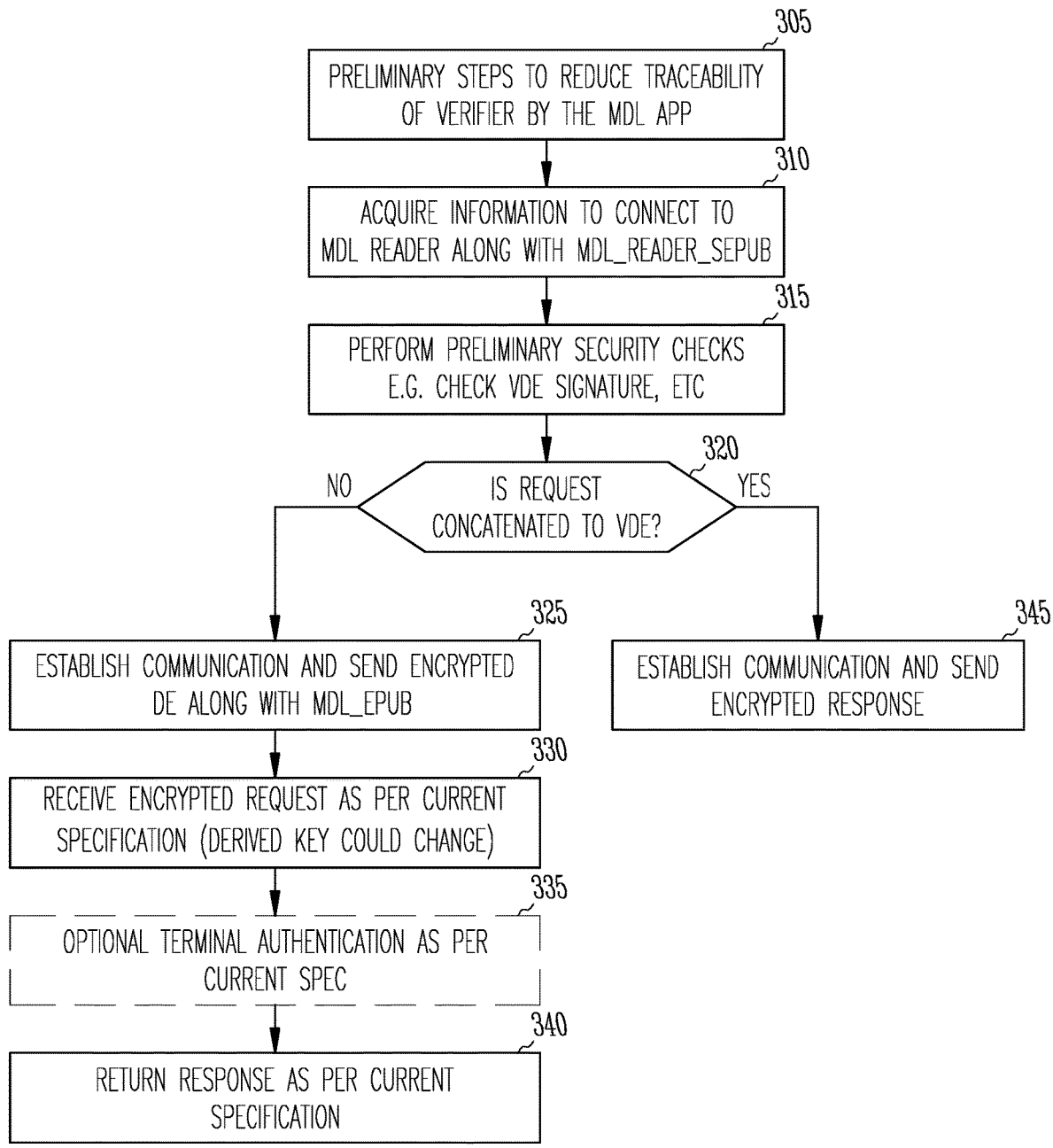
FIG. 3 is a flow diagram of an example of a method of mDL device engagement started from the verifier side.

FIG. 3 is a flow diagram of another example of a method of mDL device engagement started from the verifier side (vDE). Before the DE data is sent, at 305 the communication between the mDL App and the mDL reader may include some preliminary steps to reduce traceability. These preliminary steps may include sending information that is made as dynamic as possible. The mDL reader may send the dynamic information. The dynamic information may include a quick response (QR) code that is dynamically created and the mDL App scans the QR code and returns the QR code to the mDL reader as the dynamic information. In another example, the badge may include a near field communication (NFC) tag or other contactless tag and the badge may be synchronized to the mDL reader and the dynamic information may have been renewed before the control situation started.

At 310, the mDL App engages with the mDL reader (the verifier device) using the QR code, an NFC handover, or the "click to app" link within the web page (e.g. deep linking to an App calling default App for identity), or other means to receive the information to connect to an identified reader. As part of the device engagement, the mDL App receives a public key from the mDL reader which is used in the process of encrypting the device engagement data (e.g., to share the mDL ephemeral public key) prior to sending other DE data from the mDL App to the mDL reader.

At 315, the mDL App may check if the information acquired so far has been issued by a device with a certificate from a trusted authority. At 320, the mDL checks for the particular case where the vDE comes with the request and acts accordingly (e.g., where a certificate is included in the request). At 325, if the request is not included, the mDL App sends its DE data encrypted. At 330, the mDL receives an encrypted Request. At 335, the mDL App optionally authenticates the mDL reader terminal. At 340, the mDL App sends a Response. If the request is included at 320, then at 330 the mDL App sends the encrypted Response. In subsequent steps, the exchanges of information continue.

The public key acquired from the verifier side as part of the vDE can be a somewhat ephemeral key and the key may be changed at the discretion of the mDL reader to prevent tracking. The public key may be provided as part of a certificate from the trusted authority (TA). The mDL App may check the certificate over a list of TAs and connect accordingly. Alternatively, the vDE data may be signed by an authority trusted by the mDL App and the mDL App proceeds accordingly. The vDE may include the option to connect using a private WiFi network, or using the Internet. The vDE may provide a uniform resource identifier (URI) to which to connect, and a certificate pinning information to match with the certificate from the transport layer security (TLS) session. All exchanged information may be encrypted point-to-point between the mDL App and the mDL reader, and all intermediate components or the front end web server of the infrastructure only see encrypted data.

The vDE provides some options not available for a mDL App side DE. For example, the vDE may include a signature, and the vDE data may have information for connection over the Internet (e.g., the mDL reader web front end URI and the certificate pinning for the TLS). Connecting using the Internet may cause the communication between the mDL App and the mDL reader to be faster because only the communication channel may only have to secured once for the communication session. It may also contain the request itself so that the mDL App can send the response immediately. The vDE data can be encoded using concise binary object representation (CBOR) and further presented using QR code, NFC data exchange format (NDEF) tag, or URI. The vDE data does not necessarily have to be presented by the mDL reader itself but the vDE data can be presented in a web page, a badge, etc. Other readable media may be used. The mDL App can scan the QR to start the device engagement. The NFC handover using NDEF Tag can be used to trigger the mDL App to start the device engagement. A URI containing the CBOR vDE may be used to open the appropriate App on the mobile device for the mDL App.

The mDL App side DE provides a definite structure to send the ephemeral key of the mDL App. It also provides for additional communication methods that the mDL App may prefer. The mDL DE data is sent encrypted either using the public key or a key derived from the public key and an ephemeral private key of the mDL reader whose pubic key is included with the DE data.

The additional communication methods may include an offline request. Typically, the mDL reader request is delivered after the DE data has been received by the mDL reader. The mDL reader request can be encrypted using a key derived from the mDL reader ephemeral public key and mDL reader ephemeral private key. When the mDL reader ephemeral public key matches the mDL reader ephemeral private key, sending the mDL reader public key is unnecessary. The mDL reader request could be part of the vDE data. In that case the request CBOR can be added to the vDE data and shared without encryption. This approach presents the advantage that the mDL App can respond immediately. This might be of particular interest for over the internet verification where the response relies on TLS, which can provide the necessary elements to confirm the mDL reader is authorized to receive the response.

The additional communication methods may include an offline response. The mDL response is typically delivered encrypted using the derived key from mDL reader public key and mDL private key. For the offline request, the mDL request may be concatenated to the vDE data. The offline response is returned along with the mDL App public key for the mDL reader to be able to compute the derived key used as a decryption key to decrypt the response.

Figure 4:
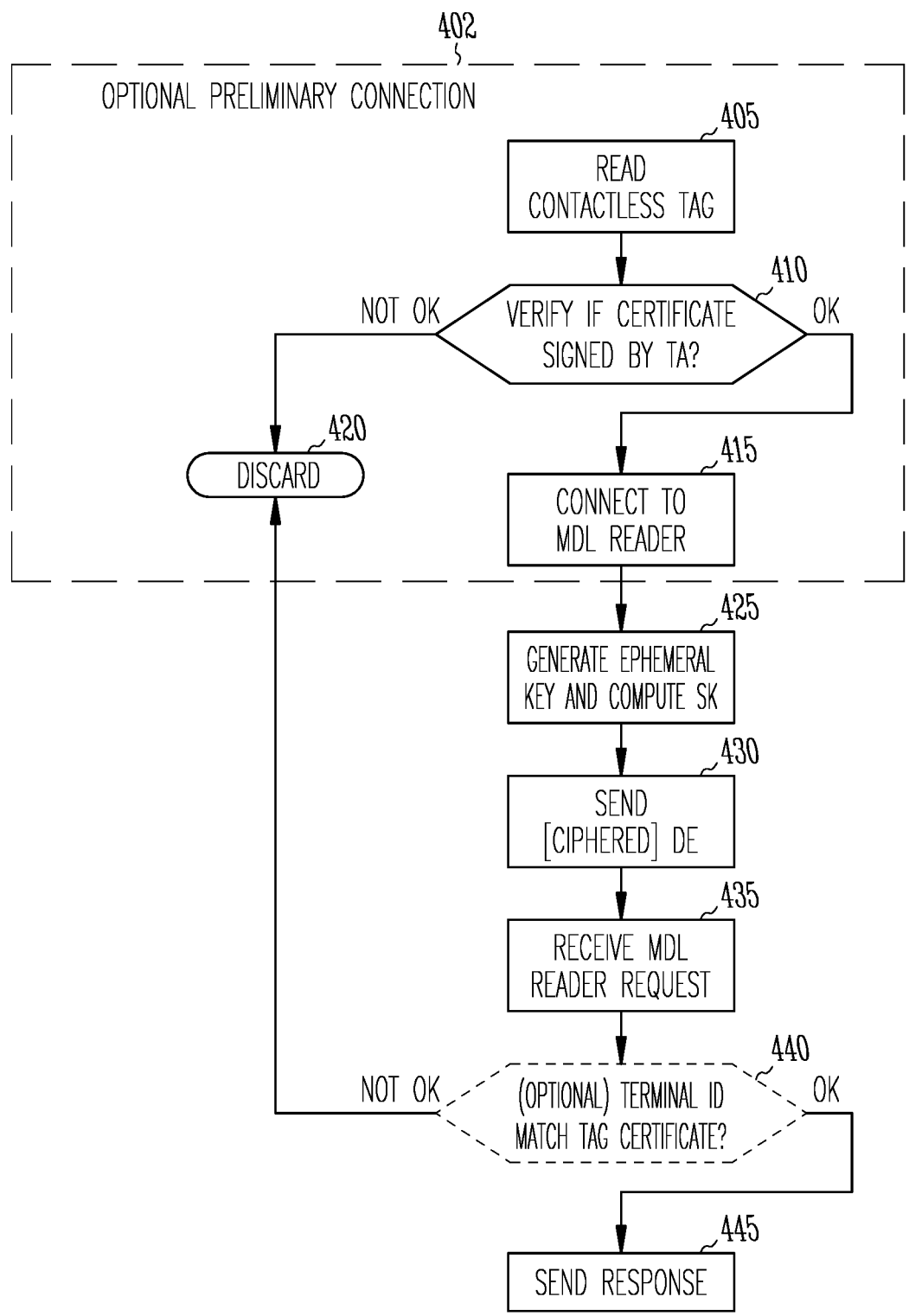
FIG. 4 is a flow diagram of an example of a method of mDL device engagement started from the mDL holder side.

FIG. 4 is a flow diagram of an example of a method of mDL device engagement started from the mDL App side. As with verifier side DE, the communication between the mDL App and the mDL reader may include some preliminary steps to reduce traceability. These preliminary steps 402 may include sending dynamic information that changes with the establishment of the channel. The dynamic information may be sent by the mDL App. The dynamic information to be sent to the mDL reader may be read from by the mDL App intermediate media (e.g., a badge) in possession of the police officer that is not included with either the verifier device or the mobile device. The intermediate media may include or carry a quick response (QR) code that is dynamically created and the mDL App scans the QR code and sends the QR code to the mDL reader as the dynamic information. In another example, the intermediate media may include a near field communication (NFC) tag or other contactless tag and the mDL App reads the NFC tag and sends information of the NFC tag to the mDL reader as the dynamic information. In another example, the intermediate media may be synchronized to the mDL reader and the dynamic information may have been renewed before the control situation started.

There are additional advantages in using an intermediate media readable by the mDL App. Typically, a police officer asks for a driving license from the driver and then takes it back to the police car where proper check of the license can be performed. For an mDL, it is not realistic to consider that the police officer would take the mobile device away from the driver and back to the officer's car. Also, it is likely that the police officer's car is not be equipped with the mDL reader. Portable mDL readers present many issues: easier theft, higher risk of impersonation of a police officer, increased risk of damage (e.g., from dropping), etc.

The information scanned or read from the badge or other intermediate media can be used to identify that the officer is genuinely a police officer and the channel opened between the mDL App and the mDL reader can be bound to the police officer through the information carried by the intermediate media. Using this approach, the driver does not have to turn their phone over to the police officer, and it can be used to ensure that the police officer is genuine and not someone posing as a police office. This eliminates the risk of giving the phone to someone who is actually not a police officer.

Figure 5:
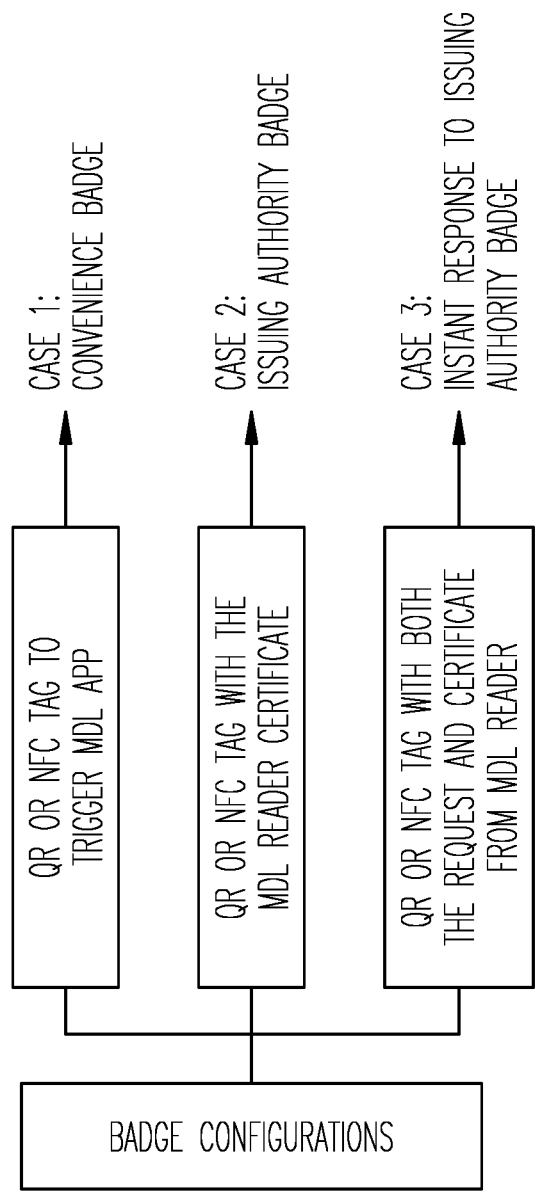
FIG. 5 is a diagram of different various types of scannable or readable badges.

FIG. 5 is a diagram of different various configurations of scannable or readable badges that may have different levels of information included in the badge. In Case 1, the badge can be referred to as a Convenience badge. The badge contains information about the type of mDL App to activate and display (e.g., one or more mDL reader communication profiles for the mDL App type). Once the appropriate mDL App is activated and optionally visible on the mobile screen, the scanned data (e.g., QR code) or read data (NFC tag data) can be sent as the dynamic information.

In Case 2, the badge can be referred to as an Issuing Authority badge. In addition to the mDL Reader communication profiles of the Convenience badge with the type of App to active and display, the Issuing Authority badge contains an mDL reader certificate from the Issuing Authority. The mDL App validates the mDL reader certificate over recorded Trusted Authorities and accordingly connects to the mDL Reader associated with the badge. The mDL App may then share encrypted DE data with the mDL reader over the encrypted communication channel. The DE can be digitally signed to provide a means for the mDL App to confirm authenticity of the DE. The digital signature may be added by an Issuing Authority that is trusted for establishing a connection.

In Case 3, the badge includes instant response capability. In addition to the information in the Issuing Authority badge, the Case 3 badge includes the mDL reader Request that may include the certificate. The mDL App validates the certificate using recorded Trusted Authority certificates and prepares an encrypted Response to the Request. The Response may be presented as a bar code.

Returning to FIG. 4, at 405 the mDL App reads the information from the badge. If the intermediate media is a convenience badge (Case 1 badge), the badge is read using the mobile phone of the driver. When the badge is a contactless tag, the NDEF information is used to recognize the type of App (e.g., the mDL App) and the associated App is made active and visible on the mobile phone. When the badge includes a QR code instead of a contactless tag, encoded NDEF information of the QR code is used to recognize the type of App, (e.g. mDL App) and the associated App is made active and visible on the mobile phone. Interaction with the user (e.g., to obtain user consent) may be performed.

When the intermediate media is an Issuing Authority badge (Case 2 badge), the police officer badge is configured with the mDL reader certificate and the badge contains the communication establishment information. The police officer asks for the citizen's driving license, and if the citizen has an mDL, the officer present their badge for scanning. The badge is read (e.g., the badge includes a contactless tag) by the mDL App receives the information necessary.

At 410, the mDL App checks whether the certificate read from the badge is issued by a Trusted Authority. If the certificate is verified, at 415 the mDL App uses the communication profile information received from the badge to establish communication with the mDL reader. If the certificate is not verified, the device engagement is discarded at 420. As in the case for verifier side engagement, the connection to the mDL reader may not occur right away. After the engagement data is transferred, the connection to the mDL reader and the next communication may occur based on the proximity of the mobile communication device and the mDL reader.

At 425, the mDL App generates ephemeral keys and prepares the device engagement data (DE). The certificate of the badge may include a public key, instead of receiving an ephemeral key from the mDL reader as in the vDE case. The key derived from the public key is a secret key ($SK_{DE}$), and DE is encrypted using the $SK_{DE}$. At 430, the encrypted DE is sent to the mDL reader with the mDL App ephemeral key.

The mDL reader receives the encrypted DE along with the mDL App ephemeral key and uses the information to compute the derived key and $SK_{DE}$ and then deciphers the received DE. At 435, the mDL reader sends the Request, and at 445 the mDL App sends the Response. In some embodiments, the mDL App encrypts the Response using a cryptographic method that uses the ephemeral key (e.g., the information may be ciphered using the ephemeral key, or the information may be encrypted using a key derived from the ephemeral key). Optionally, the mDL App may verify identification of the reader terminal at 440, for example by at least one of a digital signature or a certificate. More detail of the process of mDL device engagement started from the mDL App side when the officer's badge is a Case 2 badge can be found in Appendix A.

When the intermediate media is a Case 3 badge, the information contained in the badge includes the request (e.g., a CBOR-encoded request) normally sent from the mDL reader for the convenience badge and issuance authority badge. The police officer askes for the citizen's driving license, and if the license is mDL, office asks to scan or otherwise have the mobile phone read the information of the badge. The mDL App checks whether such a certificate is valid and issued by a Trusted Authority. The mDL App generates ephemeral keys and prepares the encrypted response data without waiting for a Request from the mDL reader. The response data may be encrypted using $SK_{DE}$ and encodes the data along with a public key to present the response as a bar code (or other optical code). The MDL reader scans the bar code, computes the $SK_{DE}$, and deciphers the Response. An example of an extension to the process of mDL device engagement started from the mDL App side when the officer's badge is a Case 3 badge can be found in Table 1.

Figure 6:
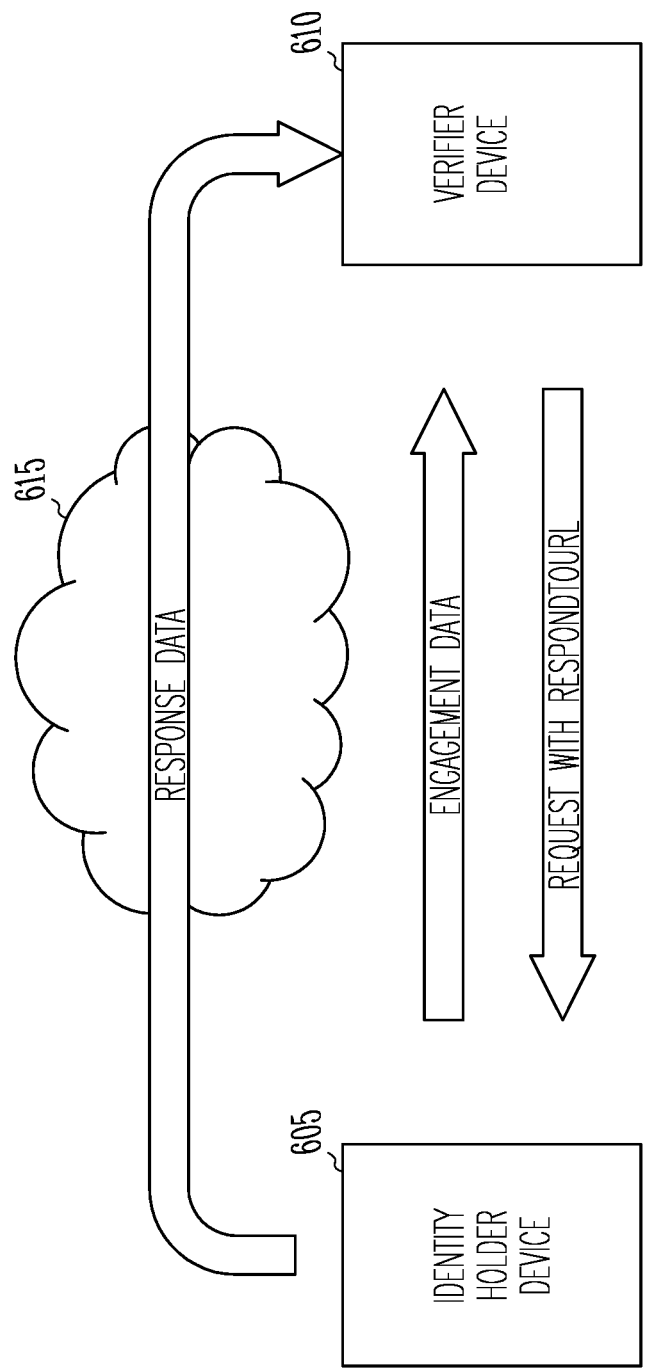
FIG. 6 is a block diagram of portions of another example of an mDL system.

For the case where the device engagement is of mDL device engagement started from the mDL App side, the mDL App Response to an mDL reader Request can be communicated using the Internet. FIG. 6 is a block diagram of portions of another example of an mDL system. The identity holder device of the citizen 605 (e.g., the mobile device with the mDL), and the verifier device 610 (e.g., mDL reader) of the issuing authority are shown. The mDL App sends the device engagement data and the verifier device 610 returns a Request. The Response from the mDL App is sent over the Internet 615 (e.g., using HTTPs POST). Some benefits of using the Internet to communicate the Response include taking advantage of high speed connections (e.g., 5G around the corner) when they are available, being able to send the Response without always needing to open a new secure communications channel, and taking advantage of the Internet as a universal method of communicating the Response to any kind of mDL reader.

A challenge to using the Internet for mDL communications is that while both the mDL App and the mDL reader know their respective Internet connectivity status, the devices need to exchange status to enable peer-to-peer communication over the Internet. To resolve this issue, the Request from the mDL reader can include a Universal Resource Locator (URL) that the mDL App can respond to (e.g., using HTTPs POST).

The mDL reader may include the URL when the mDL reader has a good connection to the Internet. The mDL App may have the option (e.g., based on its Internet connection status or Internet availability) to send the Response using the Internet channel or to use the communication channel used for the mDL Request. The mDL App may elect to send the Response via the Internet when the mDL App also has a good connection to the Internet. One or both of the mDL reader and the mDL app may determine the connectivity status of the network by attempting a communication via the Internet with a server identified in the URL. The Response may be transmitted via an Internet connection to the mDL reader through a trusted web server identified using the URL. The mDL reader receives a ciphered Response from the mDL App, and the mDL reader may rely on the URL to retrieve the corresponding session.

FIG. 7 is an example of including a URL in an mDL reader Request. The URL for the mDL App Response is provided by the mDL reader in the request part of optional terminal identification data sent by the mDL reader. In addition to the fact that the Request comes from the mDL reader ciphered using an ephemeral key from the mDL App and contains a reference to the engagement data provided at a short distance, the mDL App may take advantage of the Trusted Authority or Authorities not only to perform terminal identification but also to validate the HTTPs connection.

In some examples, the HTTPs authentication is bound to the terminal identification using the same certificate used to identity the Request and the front end server of the infrastructure. The terminal identification along with the HTTPs authentication using the trusted authority, and the mDL Request being ciphered for sending to the mDL App and referencing the DE data ensures a sufficient level of trust for the HTTPs POST Response data from the mDL App.

FIG. 8 is another example of including a URL in an mDL reader Request. The URL is included in the Request as part of an optional field. Trust for communication on the channel is based on the Request being encrypted using information from the device engagement data. Trust for the communication comes from the secure DE/Request exchange between the mDL reader and mDL App and the assumption that the Trusted Authority presented to the App for sending the HTTPs POST data is a trusted web server. The provides a level of security similar to when responding to a new communication channel, because the communication is based on engagement over a short distance, and the ephemeral keys from the mDL App and mDL reader.

FIG. 9 is another example of including a URL in an MDL reader Request. The Request CBOR is modified to include the URL for the Response. When the mDL reader is connected to the Internet and the mDL reader supports receiving the Response via the Internet, the mDL reader may format the Request to include the URL. When the mDL App receives a Request with a URL and the mDL App supports sending the Response via the Internet, the mDL App may send the Response using HTTPs POST.

While neither the device engagement data nor the response data is modified, and therefore the security level is unchanged and no security issues are foreseen in using an Internet channel, additional security can be provided by the HTTPs protocol. For example, when the mDL App establishes the HTTPs connection prior to returning the encrypted response, the mDL App may verify that the certificate from the mDL reader HTTPs interface is issued by a Trusted Authority. Trusted Authorities for such response method may be managed at the mDL App level rather than by the mobile phone operating system (OS). Furthermore, when the mDL Reader request includes Reader Identification, both the Reader Identification certificate and HTTPs authentication certificate could match.

Returning to FIG. 6, the citizen presents their identity App to the Verifier device 610 (e.g., mDL reader) by sending device engagement data. The Verifier device 610 is connected to a network (e.g., a cellular network) and to the Internet 615. The Verifier device 610 receives the device engagement data. The Verifier device continues to communicate on one of the proposed communication channels provided as part of the engagement data and shares the Request for information to the citizen's Holder device 605. The Request also includes a URL where the Holder device 605 (e.g., a mobile communication device) can post a Response to the Request. The Holder device may receive a Request that includes the Response to be sent to the URL.

The Holder device is connected on a network in communication with the network the Verifier device is connected to. The Holder device prepares the Response and conditionally elects to send the Response to the URL from the Verifier Device. The Holder device establishes an HTTPs connection to communicate the Response.

During this process the Holder device may check for a certificate or certificates from the HTTPs server to be trusted (e.g., issued by a trusted authority to the Holder device or mDL App). Additionally, if the Request included identification of the Verifier device in a form of a certificate, the same certificate could be used by the HTTPs web server and optionally verified as matching by the mDL App (e.g., the certificate it could be a certificate from the same trusted authority). Once the communication to the specified URL has been established, the Response data can be provided by the mDL App of the Holder device 605. In some embodiment the Holder device uses POST method to send the response over HTTPs. In another example, the Holder device 605 may us a PUT communication to send the Response data, and the Verifier device 610 may take advantage of the PUT communication to issue a GET communication to get more information from the Holder device 605.

It may be desired for an mDL to support both a domestic driving permit (DDP) and an international driving license (IDL). A challenge for supporting both types is that the DDP may include additional information, and the DDP may use the local alphabet (which may not be a Latin alphabet) and language. These may not be supported by an IDL. Further, the citizen may have a driving license from more than one country. It is desirable for an mDL to accommodate the DDP by being able to support the additional DDP data elements while minimizing the data needed for the support. Also, it is desired to support the local alphabet of the DDP and the preferred language of the citizen (which may be different from the DDP language). Additionally, an mDL reader won't know about a citizen's possession of a valid DDP for the country ahead of sending a Request.

To help support language differences in an mDL, the device engagement data may include an optional field for the citizen's (i.e., the mDL holder) preferred language. An example of device engagement data including an optional field is shown in FIG. 10. However, the approach of FIG. 10 would not be able to be used to specify a country code for the DDP because the preferred spoken language may not be specific to a single country, and because a single country may have multiple spoken languages. Also, Asian countries have different spoken languages, but some share the same written language. Therefore, the Device Engagement should allow for a list of preferred languages. The preferred languages can be different than the country code. This would be better than merely a default to English when not matching the indicated single preferred language.

Further, the approach of FIG. 10 may not properly address some issues or may not address them efficiently. For example, the optional terminal identification may provide enough information to the mDL App about domestic terminals, but this terminal identification comes with a Request issued by an mDL reader without knowing about a DDP of the citizen. This prevents minimizing the transfer of needed data minimization to a single step. Local data can be requested in subsequent requests, but this is not efficient.

An improvement to the approach of FIG. 10 is to provide DE, Request and Response communications that accommodate DDP information. For example, the DE provides support for more than one preferred language of the holder of the mDL holder, which provides more options for communicating to the holder. The Request from the mDL reader can include IDL data elements and may optionally include DDP data elements. This allows for the mDL reader to ask for supplementary information from a DDP, for duplicated information from DDP, or a combination thereof. The mDL reader may also ask for one or both of automobile registration information and insurance information from the mDL App. A standard for tags for the DDP data elements don't need to be defined. The response from the mDL App can also include IDL data elements and may optionally include DDP data elements.

For the DE engagement communication, having the option for the DE communication to support more than one preferred language provides great benefits for Asian countries and to some extent Arabic countries where the spoken language may be different, but the written language may be common. Alternatively, the field that specifies the language could be changed for written language. The fall back may be to an international language (e.g., English). Appendix B is a chart showing the DE data that supports a preferred language. In another alternative, the field may include a structure to list more than one preferred language of the holder.

The Request from the mDL reader can request data elements of the IDL and optionally request data elements of the DDP of the holder. The elements can be requested individually, or multiple data elements for multiple documents may be requested. The multiple documents may come from different issuing authorities. The Request CBOR could be provided in two parts of the same Request: one part for the IDL data elements and one for the DDP data elements. The Request data fields are shown in Appendix C. The DDP fields allow for data objects (DOs) for the local country to be requested.

The Response from the mDL App may optionally include DDP data elements. The Response may contain multiple data elements from multiple documents from multiple issuing authorities. The Response data fields are shown in Appendix D. The example of Appendix C is for passive authentication. However, once the document identifier is provided a different structure could be presented as in Appendix E. Appendix F shows the resulting data fields.

The systems, devices, and methods described provide improvements for a mDL system. These improvements include a flexible system where device engagement can begin from either the mobile device side or the verifier side. A secure communication channel can be either the channel used for device engagement or can be a network such as the Internet. The mDL system also provides for support of preferred languages for the holder of the mDL.

ADDITIONAL EXAMPLES AND DISCLOSURE

Example 1 includes subject matter (such as a method including steps, or a computer readable medium including instructions that when performed by processing circuitry cause a device to perform steps) comprising transferring information including a response uniform resource locator (URL) between a primary device and a secondary device using a primary communication channel between the primary device and the secondary device; determining, using the secondary device, status of connectivity of a network separate from the primary communication channel; transmitting, by the secondary device, a response to a request from the primary device via the network using the response URL when the status indicates the network is available, and transmitting the response via the primary communication channel when the status indicates the network is unavailable.

In Example 2, the subject matter of Example 1 optionally includes the primary device is a verifier device and the secondary device is a mobile communications device, and the method further including transferring engagement data between the primary device and the secondary device, and verifier engagement data is transmitted from the verifier device prior to mobile engagement data being transmitted by the mobile communications device.

In Example 3, the subject matter of Example 2 optionally includes the URL being included in the engagement data transmitted by the verifier device.

In Example 4, the subject matter of Example 2 optionally includes the URL being included in the request from the verifier device.

In Example 5, the subject matter of one or any combination of Examples 2-5 optionally includes the verifier engagement data including a digital signature indicating that the verifier engagement data is from a trusted source.

In Example 6, the subject matter of Example 1 optionally includes the primary device is a verifier device and the secondary device is a mobile communications device, and the method further including transferring engagement data between the primary device and the secondary device, and mobile engagement data is transmitted from the mobile communications device prior to verifier engagement data being transmitted by the verifier device.

In Example 7 the subject matter of Example 6 optionally includes encrypting the request using an ephemeral key provided to the verifier device with the mobile engagement data.

In Example 8, the subject matter of one or both of Examples 6 and 7 optionally includes obtaining, with the mobile communications device, information carried on intermediate media; and including information related to the mobile driving license application in the mobile engagement data.

In Example 9, the subject matter of one or any combination of Examples 1-8 optionally includes analyzing the status of network connectivity by attempting a communication via the Internet with a server identified in the URL, and wherein transmitting the response includes transmitting the response via an Internet connection to the primary device through a trusted web server identified using the URL.

In Example 10, the subject matter of one or any combination of Examples 1-9 optionally includes transferring information via the primary channel using one of a proximity-based communication protocol or a WiFi aware communication protocol.

In Example 11, the subject matter of one or any combination of Examples 1-10 optionally includes transmitting a request from the primary device that includes a certificate that identifies the primary device to the secondary device as a trusted source.

In Example 12, the subject matter of one or any combination of Examples 1-11 optionally includes transmitting a request from the primary device that includes pinning information, and the secondary device identifies the primary device as a trusted source by matching the pinning information to a certificate previously received by the mobile communication device.

Example 13 can include subject matter (such as a method including steps, or a computer readable medium including instructions that when performed by processing circuitry cause a device to perform steps) or can optionally be combined with one or any combination of Examples 1-12 to include such subject matter, comprising reading, using the mobile communication device, information carried on media intermediate the mobile device and the verifier device, wherein the information includes a public key; encrypting device engagement data using the public key; transmitting the encrypted device engagement data from the mobile communication device to the verifier device, wherein the encrypted device engagement data includes the public key; receiving, by the mobile communication device, a request from the verifier device that includes an ephemeral key encrypted using the transmitted public key; and sending, by the mobile communication device, a response encrypted using a cryptographic method that uses the ephemeral key.

In Example 14 the subject matter of Example 13 can optionally include the information read from the intermediate media including a certificate, and the method optionally further includes determining, by the mobile communication device, whether the certificate belongs to a trusted authority; and communicating, by the mobile communication device, the device engagement data to the verifier device in response to the mobile communication device determining that the certificate belongs to a trusted authority.

In Example 15, the subject matter of one or both of Examples 13 and 14 optionally includes the information carried by the intermediate media including a digital signature indicating that the information is from a trusted source.

In Example 16, the subject matter of one or any combination of Examples 13-15 optionally includes reading the information from the intermediate media offline from a communication network.

In Example 17, the subject matter of one or any combination of Examples 13-16 optionally includes the intermediate media being a badge associated with authority personnel, and the badge carries the information.

In Example 18, the subject matter of Example 17 optionally includes the badge carries information that includes a certificate, and the method optionally further includes determining, using the mobile communication device, if the certificate is a valid certificate with a valid signature; generating an optical code at the mobile communication device when determining the certificate is a valid certificate with a valid signature; and presenting the optical code via a user interface of the mobile communication device.

In Example 19, the subject matter of Example 18 optionally includes enabling a reader carried by the authority personnel to compute a decryption key using the optical code; generating a response at the mobile communication device that include mobile driving license information for a carrier of the mobile communication device; transmitting the response to the reader carried by the authority personnel; decrypting the response at the reader with the decryption key.

Example 20 can include subject matter (such as a method including steps, or a computer readable medium including instructions that when performed by processing circuitry cause a device to perform steps) or can optionally be combined with one or any combination of Examples 1-19 to include such subject matter, comprising receiving, at a mobile communication device, a request for information from a mobile driving license; in response to receiving the request, preparing, at the mobile communication device, a response that includes multiple data elements related to multiple documents; and transmitting the response from the mobile communication device.

In Example 21, the subject matter of Example 20 optionally includes storing an electronic record in memory of the mobile communication device that includes information related to the multiple mobile driving licenses.

In Example 22, the subject matter of one or both of Examples 20 and 21 optionally includes storing an electronic record in memory of the mobile communication device that includes a language preference of a user, wherein the language preference comprises an indicator of a primary language for a user identified by the mobile driving license.

In Example 23, the subject matter of Example 22 optionally includes storing a country code identifier as part of the electronic record for the mobile driving license; and including the country code identifier in the response, wherein the country code identifier is different from the language preference.

In Example 24, the subject matter of one or any combination of Examples 20 optionally includes the mobile communication device transmitting the response using a wireless proximity-based communication protocol.

In Example 25, the subject matter of one or any combination of Examples 20-24 optionally includes storing an additional language preference as part of the electronic record for the mobile driving license; and including the additional language preference in the response.

In Example, 26, the subject matter of one or any combination of Examples 20-25 optionally includes transmitting a response that includes multiple data elements related to a driving license and at least one of an automobile registration and automobile insurance information.

In Example, 27, the subject matter of one or any combination of Examples 20-26 optionally includes transmitting a response that includes multiple data elements related to multiple driving licenses of the holder from different license issuers.

In Example, 28, the subject matter of one or any combination of Examples 20-26 optionally includes transmitting a response that includes multiple data elements related to multiple driving licenses of the holder from different license issuers.

These non-limiting examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including"

and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

Appendix A

Case2:

| mDL App | Direction | Badge | mDL Reader | Remarks | |
|---|---|---|---|---|---|
| Verify certificate Validate certificate over recorded Trusted Authorities Continue accordingly | ← | mDL reader certificate with Ri.Pub | | mDL reader owns Ri.Pub and Ri.Priv | O[1] |
| Generate ephemeral DH Key pair as for default process (mDL.ePub/Priv) Compute shared secret using mDL.ePriv and Ri.Pub Use KDF to Compute $SK_{DE}$ from shared secret Encrypt the DE data with $SK_{DE}$: $DE_{enc}$ = AES-GCM-ENC($SK_{DE}$, DE_DATA) | | | | | C |
| Establish a connection to the mDL Reader as per the communication profile(s) delivered by the Badge | ← → | | Acknowledge incoming connection from mDL App | The mDL App connects as for standard process | C |
| Send $DE_{enc}$ along with mDL.ePub | → | | Use mDL.ePub and Ri.Priv with KDF to computes $SK_{DE}$ Decipher $DE_{enc}$ to get DE_DATA Create ephemeral keys R.ePub and extract mDL.EPub from DE_DATA to compute the key to encrypt the request | Retrieve device engagement data from trusted channel | C |
| | | Continue with default process M | | | |
| If additionally a terminal identification is performed, then the mDL App matches terminal identification certificate against the one from the badge. | ← | | mDL reader may include terminal identification data | Request could be shared over a new trusted channel - as per default process | O |
| | | Terminate with default process M | | | |

Case 3 Extension:

| mDL App | Direction | Badge | mDL Reader | Remarks | |
|---|---|---|---|---|---|
| Verify certificate Validate certificate over recorded Trusted Authorities Continue accordingly | ← | mDL reader certificate with Ri.Pub | | mDL reader owns Ri.Pub and Ri.Priv | O |
| | | directly present the response as QRCode M | | | |
| Encrypt the Response using $SK_{DE}$ and encode as a barcode along with mDL.ePub | → | | mDL reader scans the barcode uses mDL.ePub and Ri.Priv with KDF to computes $SK_{DE}$ extracts the response data | Same response process except for using $SK_{DE}$ | $C_c$ |

Appendix B

| Tag | Len | | | | Device Engagement | Mandatory/Optional/Conditional |
|---|---|---|---|---|---|---|
| 6E | xx | | | | Value | |
| | | | | | Application related data template | M |
| | | Tag | Len | | Value | |
| | | 02 | 01 | | Version | M |
| | | 79 | xx | | 06 + OID of authority for the Tag allocation scheme ISO IEC 18013 part 5 | M |
| | | 73 | xx | | 06 + OID of additional supported authorities 06 + OID of additional supported authorities . . . (TLV encoded) | O |
| | | 80 | xx | | Curve indicator | M |
| | | 7F49 | xx | | Ephemeral DK key mDL.EPUB for initiating secure exchange | M |
| | | | Tag | Len | Value | |
| | | | 86 | xx | Public key | M |
| | | 81 | xx | | mDL holder preferred language (ISO 639-2:1998, 3 letter code) | O |
| | | 81 | xx | | Additional mDL holder preferred language (ISO 639-2:1998, 3 letter code) | C[c] |
| | | A3 | xx | | BLE profile | O |
| | | | Tag | Len | Value | |
| | | | 02 | 1 | Version | M |
| | | | 04 | xx | Anti-collision identifier | M |
| | | A4 | xx | | Wi-Fi Aware profile | O |
| | | | Tag | Len | Value | |
| | | | 02 | 1 | Version | M |
| | | | 04 | xx | Device identifier | M |
| | | A5 | 03 | | NFC profile | O |
| | | | Tag | Len | Value | |
| | | | 02 | 1 | Version | M |
| | | A6 | xx | | Online profile (multiple of this are allowed) | O |
| | | | Tag | Len | Value | |
| | | | 01 | 1 | If set to TRUE (0x01), denotes that online-token may be requested through a supported communication channel(s) | O |
| | | | 02 | 1 | Type (rest/OIDC) | C[b] |
| | | | 02 | 1 | Version, per type | C[b] |
| | | | 80 | xx | Token identifying the mDL holder Encoded as string | C[b] |
| | | | 81 | xx | Base URL of the issuing authority Encoded as string | C[b] |

[a]This field is mandatory if there are fields that are already authorized by the mDL.
[b]shall be present only if Boolean flag (tag 01) is FALSE or absent from [A6].
[c]optional additional language is more than one makes sense Appendix C

| Type | Value | | | CBOR Type | |
|---|---|---|---|---|---|
| "DDPDOs" | Type | Value | | Map | O |
| | "CountryCode" | ISO/IEC code from the country | | Text String | M |
| | "NameSpace" | "ISO/IEC 18013-5:2019" or could be specific to DDP as per the country | | Text String | M |
| | "DOs" | Type | Value | Array | M |
| | | Requested list of objects from DDP - the tags could be different from 18013-5 name space | | Byte String | M |
| "ListOfDOs" | Type | Value | | Map | M |
| | "NameSpace" | "ISO/IEC 18013-5:2019" | | Text String | M |
| | "DOs" | Type | Value | Array | M |
| | | DO_Name 1 | Name Identifier of the data elements requested (list label for DG(s) or specific element(s)) | Byte String | M |
| | | DO_Name 2 | Name Identifier of the data elements requested (list label for DG(s) or specific element(s)) | Byte String | O |
| | | . . . | | Byte String | O |

-continued

| Type | Value | | | CBOR Type | |
|---|---|---|---|---|---|
| | | DO_Name n | Name Identifier of the data elements requested (list label for DG(s) or specific element(s)) | Byte String | O |
| "DDPDOs" | Type | Value | | Map | O |
| | "countryCode" | ISO/IEC code from the country | | Text String | M |
| | "NameSpace" | "ISO/IEC 18013-5:2019" | | Text String | M |
| | "DOs" | Type | Value | Array | M |
| | | DO_Name 1 | Name Identifier of the data elements requested (list label for DG(s) or specific element(s)) | Byte String | M |
| | | DO_Name 2 | Name Identifier of the data elements requested (list label for DG(s) or specific element(s)) | Byte String | O |
| | | . . . | | Byte String | O |
| | | DO_Name n | Name Identifier of the data elements requested (list label for DG(s) or specific element(s)) | Byte String | O |
| "Requestor_ID" | Type | Value | | Map | O |
| | "CertChain" | Type | Value | Array | M |
| | | "Cert 1" | Certificate used to verify Requestor | Byte String | M |
| | | "Cert 2" | Certificate used to verify Requestor | Byte String | O |
| | | . . . | | Byte String | O |
| | | "Cert n" | Certificate used to verify Requestor | Byte String | O |
| | "Signature" | (DE ‖ Reader Ephemeral Public Key)$_{READER\_EPHEMERAL\_KEY\_SIGN}$ | | Byte String | M |

Appendix D

| Type | Value | | | | CBOR Type | |
|---|---|---|---|---|---|---|
| | | | | | Array | M |
| Doc | Type | Value | | | Map | M |
| | "DocIdentifier" | This would be the identifier of the DDP document the information is coming from | | | Text String | M |
| | "PASigned" | Type | Value | | Array | |
| | | "RespDOs" | Type | Value | Map | |
| | | | Hash_ID | Identifier of hash record or NULL on error | Int | M |
| | | | DO_Name | Name Identifier of the data element or DG | Byte String | M |
| | | | Value | Value of the data element or DG or error messaqe | Byte String | M |
| | | | Random | Hash randomization | Byte String | C |
| | | | . . . | . . . | | O |
| | "DeviceCert" | X509 certificate used to verify data signed on the holder device | | | Array | M |
| | | "Cert 1" | Certificate used to verify Device | | Byte String | M |
| | | . . . | . . . | | | |

-continued

| Type | Value | | | | CBOR Type Array | M |
|---|---|---|---|---|---|---|
| | "MobileSOD" | Type | Value | | Map | M |
| | | "Hashes" | Type | Value | Array | M |
| | | | Hash | Type | Value | Map | M |
| | | | | Hash_ID | Identifier of the hash | Int | M |
| | | | | Value | Hash of the data element | Byte String | M |
| | | | ... | ... | ... | | O |
| | | Issuer Certificate | Certificate used to sign all objects | | Byte String | M |
| | | Signature | Authority signature of all the hashes and hash of the device certificate | | Byte String | M |
| | "ACSigned" | DeviceData | Type | Value | Map | M |
| | | | "ListOfDOs" | Type | Value | Array | O |
| | | | | "OT" | Online token (if requested) | Byte String | C |
| | | | ... | ... | | |
| | | Signature | (DE ‖ Reader Ephemeral Public key ‖ DeviceData)$_{HOLDER\_STATIC\_KEY\_SIGN}$ | | Byte String | M |

Appendix E

| Type | Value | | | CBOR Type Array | M |
|---|---|---|---|---|---|
| Doc | Type | Value | | Map | M |
| | "DocIdentifier" | "ISO/IEC 18013-5:2019" | | Text String | M |
| | Response data to IDL request | | | | |

-continued

| Type | Value | | CBOR Type Array | M |
|---|---|---|---|---|
| Doc | "DocIdentifier" | Reference of document | Text String | O |
| | | Response data to request #2 | Text string | M |

Appendix F

| Type | Value | | | | | CBOR Type Array | M |
|---|---|---|---|---|---|---|---|
| Doc | Type | Value | | | | Map | M |
| | "DocIdentifier" | "ISO/IEC 18013-5:2019" | | | | Text String | M |
| | "PASigned" | Type | Value | | | Array | |
| | | "RespDOs" | Type | | Value | Map | |
| | | | Hash_ID | | Identifier of hash record or NULL on error | Int | M |
| | | | DO_Name | | Name Identifier of the data element or DG | Byte String | M |
| | | | Value | | Value of the data element or DG or error message | Byte String | M |
| | | | Random | | Hash randomization | Byte String | C |
| | | | ... | | ... | | O |
| | "DeviceCert" | X509 certificate used to verify data signed on the holder device | | | | Array | M |
| | | "Cert 1" | Certificate used to verify Device | | | Byte String | M |
| | | ... | ... | | | | |
| | "MobileSOD" | Type | Value | | | Map | M |
| | | "Hashes" | Type | | Value | Array | M |
| | | | Hash | Type | Value | Map | M |
| | | | | Hash_ID | Identifier of the hash | Int | M |
| | | | | Value | Hash of the data element | Byte String | M |
| | | | ... | ... | ... | | O |

-continued

| Type | Value | | | | | CBOR Type Array | M |
|---|---|---|---|---|---|---|---|
| | | Issuer Certificate | Certificate used to sign all objects | | | Byte String | M |
| | | Signature | Authority signature of all the hashes and hash of the device certificate | | | Byte String | M |
| | "ACSigned" | DeviceData | Type | | Value | Map | M |
| | | | "ListOfDOs" | Type | Value | Array | O |
| | | | | "OT" | Online token (if requested) | Byte String | C |
| | | | . . . | | . . . | | |
| | | Signature | (DE ‖ Reader Ephemeral Public key ‖ DeviceData)$_{HOLDER\_STATIC\_KEY\_SIGN}$ | | | Byte String | M |
| Doc | Type | Value | | | | Map | M |
| | "DocIdentifier" | This would be the identifier of the DDP document the information is coming from | | | | Text String | M |
| | "PASigned" | Type | Value | | | Array | |
| | | "RespDOs" | Type | | Value | Map | |
| | | | Hash_ID | | Identifier of hash record or NULL on error | Int | M |
| | | | DO_Name | | Name Identifier of the data element or DG | Byte String | M |
| | | | Value | | Value of the data element or DG or error message | Byte String | M |
| | | | Random | | Hash randomization | Byte String | C |
| | | | . . . | | . . . | | O |
| | "DeviceCert" | X509 certificate used to verify data signed on the holder device | | | | Array | M |
| | | "Cert 1" | Certificate used to verify Device | | | Byte String | M |
| | | . . . | . . . | | | | |
| | "MobileSOD" | Type | Value | | | Map | M |
| | | "Hashes" | Type | | Value | Array | M |
| | | | Hash | Type | Value | Map | M |
| | | | | Hash_ID | Identifier of the hash | Int | M |
| | | | | Value | Hash of the data element | Byte String | M |
| | | | . . . | . . . | . . . | | O |
| | | Issuer Certificate | Certificate used to sign all objects | | | Byte String | M |
| | | Signature | Authority signature of all the hashes and hash of the device certificate | | | Byte String | M |
| | "ACSigned" | DeviceData | Type | | Value | Map | M |
| | | | "ListOfDOs" | Type | Value | Array | O |
| | | | | "OT" | Online token (if requested) | Byte String | C |
| | | | . . . | | . . . | | |
| | | Signature | (DE ‖ Reader Ephemeral Public key ‖ DeviceData)$_{HOLDER\_STATIC\_KEY\_SIGN}$ | | | Byte String | M |

The invention claimed is:

1. A method comprising:
transferring information including a response uniform resource locator (URL) between a primary device and a secondary device using a primary communication channel between the primary device and the secondary device;
determining, using the secondary device, status of connectivity of a network separate from the primary communication channel by initiating a connection to the network; and
transmitting, by the secondary device, a response to a request from the primary device via the network using the response URL when the status indicates the network is available, and transmitting the response via the primary communication channel when the status indicates the network is unavailable.

2. The method of claim 1,
wherein the primary device is a verifier device and the secondary device is a mobile communications device; and
wherein transferring information includes transferring engagement data between the primary device and the secondary device, and verifier engagement data is transmitted from the verifier device prior to mobile engagement data being transmitted by the mobile communications device.

3. The method of claim 2, wherein the URL is included in the engagement data transmitted by the verifier device.

4. The method of claim 2, wherein the URL is included in the request from the verifier device.

5. The method of claim 2, wherein the verifier engagement data includes a digital signature indicating that the verifier engagement data is from a trusted source.

6. The method of claim 1,
wherein the primary device is a verifier device and the secondary device is a mobile communications device; and
wherein transferring information includes transferring engagement data between the primary device and the secondary device, and mobile engagement data is transmitted from the mobile communications device prior to verifier engagement data being transmitted by the verifier device.

7. The method of claim 6, including:
obtaining, with the mobile communications device, information carried on intermediate media;
causing, in response to obtaining the information, the mobile communication device to automatically open a mobile driving license application stored on the mobile communication device; and
including information related to the mobile driving license application in the mobile engagement data.

8. The method of claim 1, wherein the status of network connectivity is analyzed by attempting a communication via the Internet with a server identified in the URL, and wherein transmitting the response includes transmitting the response via an Internet connection to the primary device through a trusted web server identified using the URL.

9. The method of claim 6, wherein the request is encrypted using an ephemeral key provided to the verifier device with the mobile engagement data.

10. The method of claim 1, wherein transferring information using a primary communication channel includes transferring information via the primary channel using one of a proximity-based communication protocol or a WiFi aware communication protocol.

11. The method of claim 1, wherein the request from the primary device includes a certificate that identifies the primary device to the secondary device as a trusted source.

12. The method of claim 1, wherein the request from the primary device includes pinning information, and the secondary device identifies the primary device as a trusted source by matching the pinning information to a certificate previously received by the mobile communication device.

* * * * *